(12) United States Patent
Miyahara et al.

(10) Patent No.: US 8,588,597 B2
(45) Date of Patent: Nov. 19, 2013

(54) IMAGE BLURRING CORRECTION DEVICE, CONTROL METHOD THEREOF, AND IMAGE CAPTURE APPARATUS

(75) Inventors: Shimpei Miyahara, Kawasaki (JP); Hiroki Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/177,723

(22) Filed: Jul. 7, 2011

(65) Prior Publication Data
US 2012/0014681 A1 Jan. 19, 2012

(30) Foreign Application Priority Data

Jul. 16, 2010 (JP) ................................. 2010-162214
May 9, 2011 (JP) ................................. 2011-104746

(51) Int. Cl.
*G03B 17/00* (2006.01)
*H04N 5/228* (2006.01)
*G02B 27/64* (2006.01)

(52) U.S. Cl.
USPC ........................... 396/55; 348/208.4; 359/557

(58) Field of Classification Search
USPC ........... 396/52–55; 348/208.99, 208.4, 208.7, 348/208.8, 208.11; 359/557
See application file for complete search history.

(56) References Cited

U.S. PATENT DOCUMENTS

| 8,004,570 B2 * | 8/2011 | Saito et al. ................. 348/208.5 |
| 2007/0297781 A1 * | 12/2007 | Kitano ............................. 396/55 |
| 2009/0231452 A1 * | 9/2009 | Noguchi .................. 348/208.11 |
| 2011/0157380 A1 * | 6/2011 | Yamazaki .................. 348/208.4 |
| 2012/0013752 A1 * | 1/2012 | Matsuoka .................. 348/208.4 |
| 2012/0044369 A1 * | 2/2012 | Irisawa et al. .............. 348/208.4 |
| 2012/0163784 A1 * | 6/2012 | Saito et al. ....................... 396/55 |

FOREIGN PATENT DOCUMENTS

| JP | 04-314274 A | 11/1992 |
| JP | 2000-224461 A | 8/2000 |
| JP | 2003-186073 A | 7/2003 |
| JP | 2007-240736 | 9/2007 |
| JP | 2010-117671 A | 5/2010 |

OTHER PUBLICATIONS

The above references were cited in a Sep. 18, 2012 Japanese Office Action, which is enclosed without an English Translation, that issued in Japanese Patent Application No. 2011-104746.

* cited by examiner

*Primary Examiner* — Christopher Mahoney
(74) *Attorney, Agent, or Firm* — Cowan, Liebowitz & Latman, P.C.

(57) ABSTRACT

An image blurring correction device includes a correction member which moves in a direction perpendicular to the optical axis of an imaging optical system to correct blurring of an optical image, two driving units which drive the correction member in different directions, a shake detection unit which detects a shake applied to the image blurring correction device, a correction amount calculation unit which calculates, based on shake information detected by the shake detection unit, a correction amount for correcting blurring of the optical image, and a conversion unit which converts the correction amount to cancel a driving error generated by a rotation moment applied to the correction member. The driving units drive the correction member based on the correction amount converted by the conversion unit, correcting blurring of the optical image.

18 Claims, 6 Drawing Sheets

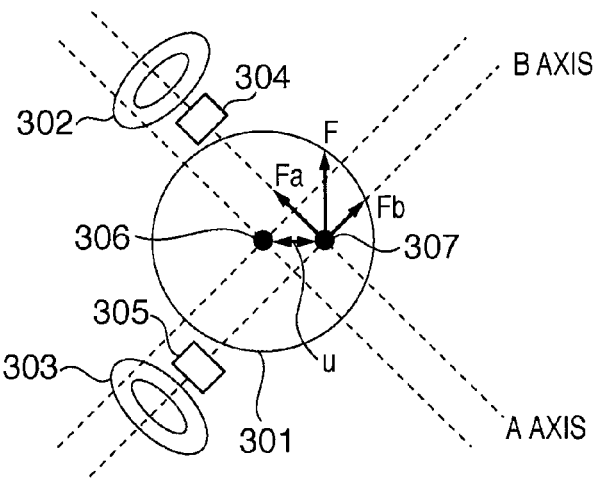
FIG. 3
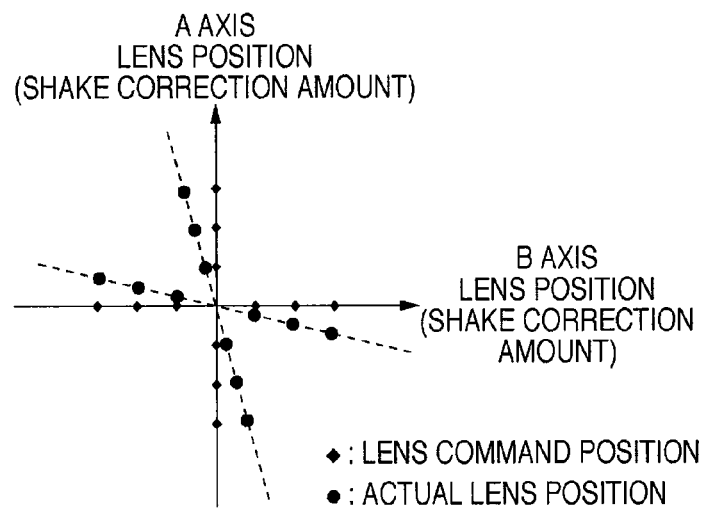
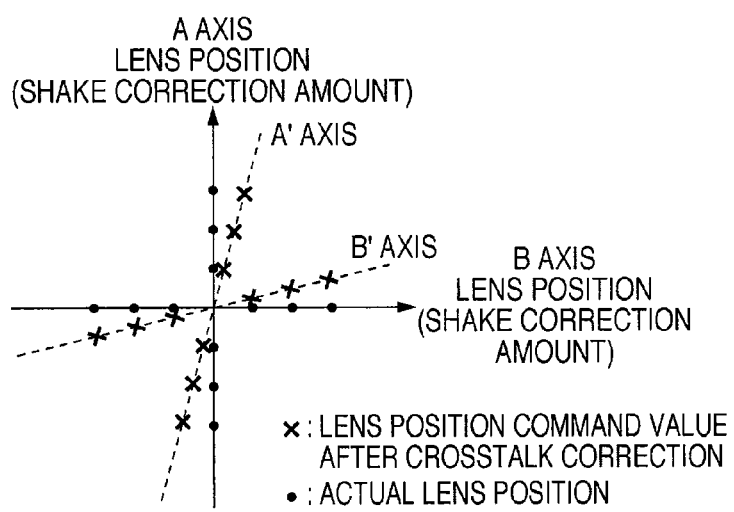
FIG. 4

IMAGE BLURRING CORRECTION DEVICE, CONTROL METHOD THEREOF, AND IMAGE CAPTURE APPARATUS

BACKGROUND OF THE INVENTION

1. Field of the Invention

The present invention relates to an image capture apparatus having a shake correction device or camera shake correctional function and, more particularly, to a technique for improving the performance of the camera shake correctional function.

2. Description of the Related Art

As recent image capture apparatuses such as a digital camera are decreasing the size and weight while increasing the zoom ratio, the influence of a camera shake is becoming serious. To solve this, a growing number of image capture apparatuses have a camera shake correctional function.

The camera shake correctional functions are roughly divided into two types, which are generally called optical camera shake correction and electronic camera shake correction. Most camera shake correctional functions of these two types detect a shake using a camera shake detection sensor. In contrast, an ultra-compact, lightweight image sensing device incorporated in a cell phone or the like often detects a motion vector from the difference between images sensed by an image sensing unit and calculates the shake amount.

In optical camera shake correction, the shake is corrected by moving a shift lens or image sensor in a direction in which the detected shake amount is canceled. In electronic camera shake correction, the shake is corrected by performing image processing to cancel the calculated shake amount.

Recently, digital cameras with a bending optical system have been developed for higher zoom ratios and lower profiles. To implement optical camera shake correction in such a digital camera, a compact, low-profile optical shift unit has been developed (Japanese Patent Laid-Open No. 2007-240736).

However, in the technique disclosed in Japanese Patent Laid-Open No. 2007-240736, a large offset is generated between the center of gravity of a movable member unit such as a shift lens and the center of action of a driving force by an actuator. A rotation moment is generated on the movable member depending on the magnitude of force. The rotation moment drives the movable member in an axial direction perpendicular to the axis of action of the driving force by the actuator. This results in an error (crosstalk) between a driving position designated by the actuator and an actual movable member position. The crosstalk may cause image blurring.

SUMMARY OF THE INVENTION

The present invention has been made to solve the above problems, and minimizes an error between a position to which a movable member should move and an actual movable member position in an optical camera shake correction device.

According to first aspect of the present invention, there is provided an image blurring correction device including a correction member movable in a direction perpendicular to an optical axis of an imaging optical system and two driving units which drive the correction member in different directions, a rotation moment being generated in the correction member driven by the driving units, comprising: a shake detection unit which detects a shake of the image blurring correction device; a correction amount calculation unit which calculates a correction amount based on an output from the shake detection unit; an error calculation unit which calculates a driving error generated by a rotation moment based on the rotation moment applied to the correction member; and a first conversion unit which converts the correction amount to cancel the driving error, wherein the driving units drive the correction member based on the correction amount converted by the first conversion unit.

According to second aspect of the present invention, there is provided an image capture apparatus comprising an image blurring correction device as described above.

According to third aspect of the present invention, there is provided an image blurring correction device including a correction member movable in a direction perpendicular to an optical axis of an imaging optical system and two driving units which drive the correction member in different directions, centers of action of driving forces of the driving units deviating from a center of gravity of the correction member, comprising: a shake detection unit which detects a shake of the image blurring correction device; a correction amount calculation unit which calculates a correction amount based on an output from the shake detection unit; an error calculation unit which calculates a driving error based on the centers of action of driving forces of the driving units and the center of gravity of the correction member; and a first conversion unit which converts the correction amount to cancel the driving error, wherein the driving units drive the correction member based on the correction amount converted by the first conversion unit.

According to fourth aspect of the present invention, there is provided an image capture apparatus comprising an image blurring correction device as described above.

According to fifth aspect of the present invention, there is provided a method of controlling an image blurring correction device including a correction member movable in a direction perpendicular to an optical axis of an imaging optical system and two driving units which drive the correction member in different directions, a rotation moment being generated in the correction member driven by the driving units, comprising: detecting a shake of the image blurring correction device; calculating a correction amount based on an output from the detecting a shake; calculating a driving error generated by a rotation moment based on the rotation moment applied to the correction member; and converting the correction amount to cancel the driving error, wherein the driving units drive the correction member based on the correction amount converted in the converting the correction amount.

According to sixth aspect of the present invention, there is provided a method of controlling an image blurring correction device including a correction member movable in a direction perpendicular to an optical axis of an imaging optical system and two driving units which drive the correction member in different directions, centers of action of driving forces of the driving units deviating from a center of gravity of the correction member, comprising: detecting a shake of the image blurring correction device; calculating a correction amount based on an output from the detecting a shake; calculating a driving error based on the centers of action of driving forces of the driving units and the center of gravity of the correction member; and converting the correction amount to cancel the driving error, wherein the driving units drive the correction member based on the correction amount converted in the converting the correction amount.

Further features of the present invention will become apparent from the following description of exemplary embodiments with reference to the attached drawings.

BRIEF DESCRIPTION OF THE DRAWINGS

FIG. 3 is a view briefly showing a rotation moment generation principle in the shake correction device;

FIG. 4 is a graph briefly showing crosstalk correction in the first embodiment;

DESCRIPTION OF THE EMBODIMENTS (First Embodiment)

Figure 1:
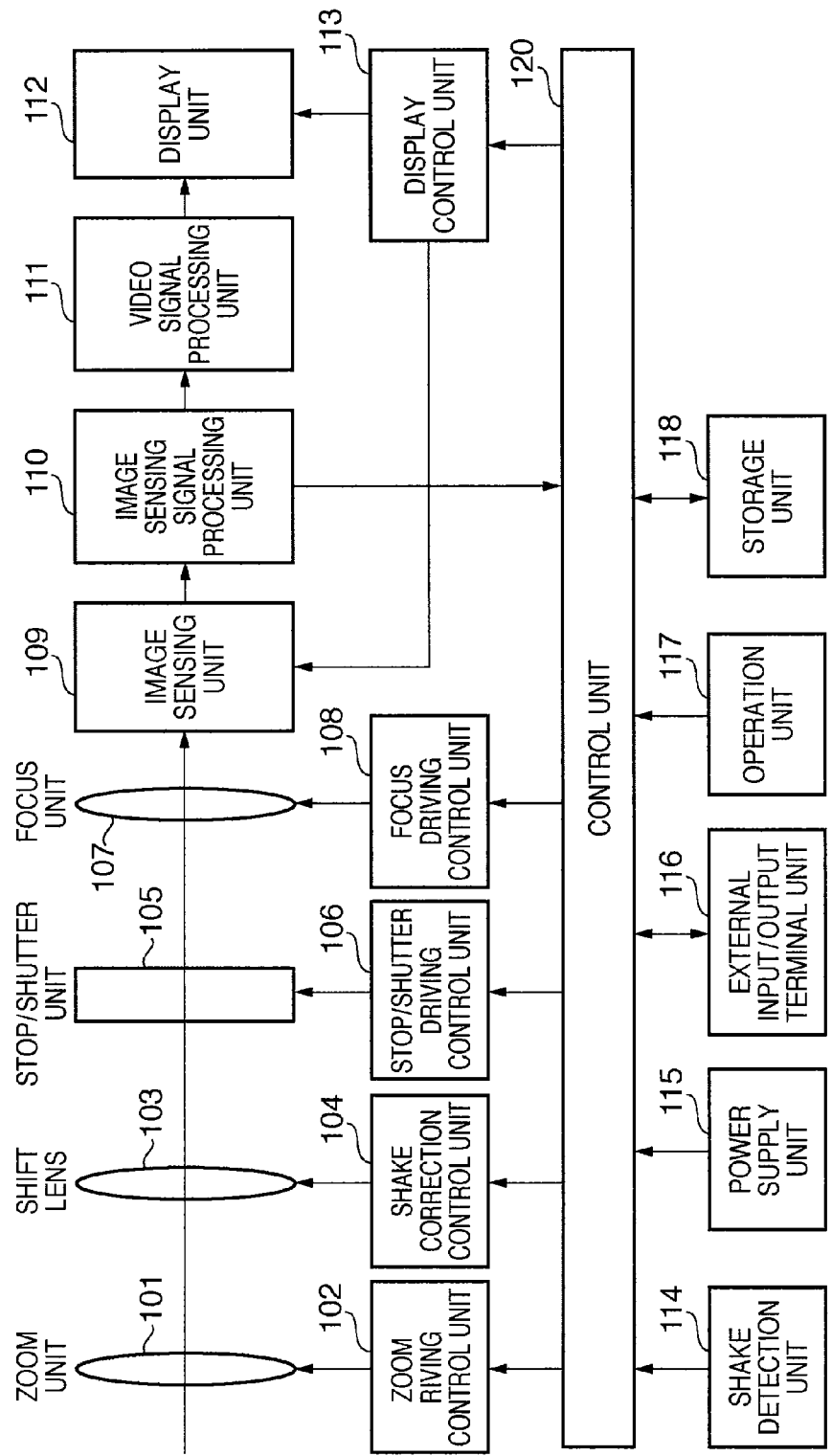
FIG. 1 is a block diagram showing the internal arrangement of an image capture apparatus according to the first embodiment of the present invention.

FIG. 1 is a block diagram showing the arrangement of an image capture apparatus according to the first embodiment of the present invention. Referring to FIG. 1, a zoom unit 101 includes a zoom lens for zooming. A zoom driving control unit 102 controls to drive the zoom unit 101. A shift lens 103 serves as a shake correction optical system (image blurring correction optical system) movable in a direction almost perpendicular to the optical axis. The shift lens 103 moves in a direction perpendicular to the optical axis of another imaging optical system to correct blurring of an optical image. A shake correction control unit 104 controls to drive the shift lens 103 (correction member). Reference numeral 105 denotes a stop/shutter unit. A stop/shutter driving control unit 106 controls to drive the stop/shutter unit 105. A focus unit 107 includes a focusing lens. A focus driving control unit 108 controls to drive the focus unit 107. Note that the members 101, 103, 105, and 107 form an imaging optical system which forms an optical image (object image).

An image sensing unit 109 includes an image sensor, and converts an optical image (object image) having passed through each lens unit into an electrical signal. An image sensing signal processing unit 110 converts the electrical signal output from the image sensing unit 109 into a video signal. A video signal processing unit 111 processes the video signal output from the image sensing signal processing unit 110 in accordance with an application purpose.

If necessary, a display unit 112 displays an image based on the signal output from the video signal processing unit 111. A display control unit 113 controls the operation and display of the image sensing unit 109 and display unit 112. A shake detection unit 114 detects the degree of a shake applied to the image capture apparatus.

A power supply unit 115 supplies power to the overall system in accordance with an application purpose. An external input/output terminal unit 116 inputs/outputs a communication signal and video signal to/from the outside. An operation unit 117 is used to operate the system. A storage unit 118 stores various data such as video information. A control unit 120 controls the whole system.

The operation of the image capture apparatus having the above arrangement will be explained.

The operation unit 117 has a shutter release button configured to turn on a first switch SW1 and second switch SW2 sequentially in accordance with the amount of pressing. The shutter release button is pressed halfway to turn on the first switch, and fully to turn on the second switch.

When the first switch of the operation unit 117 is turned on, the focus driving control unit 108 drives the focus unit 107 to adjust the focus. In addition, the stop/shutter driving control unit 106 drives the stop/shutter unit 105 to set a correct exposure. Further, when the second switch is turned on, the image sensing unit 109 is exposed and the storage unit 118 stores image data obtained from the image sensing unit 109.

At this time, if a shake correctional function ON instruction is input via the operation unit 117, the control unit 120 instructs the shake correction control unit 104 to perform a shake correction operation. Upon receiving this instruction, the shake correction control unit 104 executes the shake correction operation until a shake correctional function OFF instruction is input. If the operation unit 117 is not operated for a predetermined time, the control unit 120 outputs an instruction to stop power supply to the display for power saving. The image capture apparatus allows selecting either the still image shooting mode or moving image shooting mode via the operation unit 117. In each mode, the operation conditions of each actuator control unit can be changed.

If an instruction for zooming by the zoom lens is input via the operation unit 117, the zoom driving control unit 102 receives the instruction via the control unit 120 and drives the zoom unit 101 to move the zoom lens to the designated zoom position. At the same time, the focus driving control unit 108 drives the focus unit 107 to adjust the focus based on image information which has been sent from the image sensing unit 109 and processed by the signal processing units 110 and 111.

Figure 2:
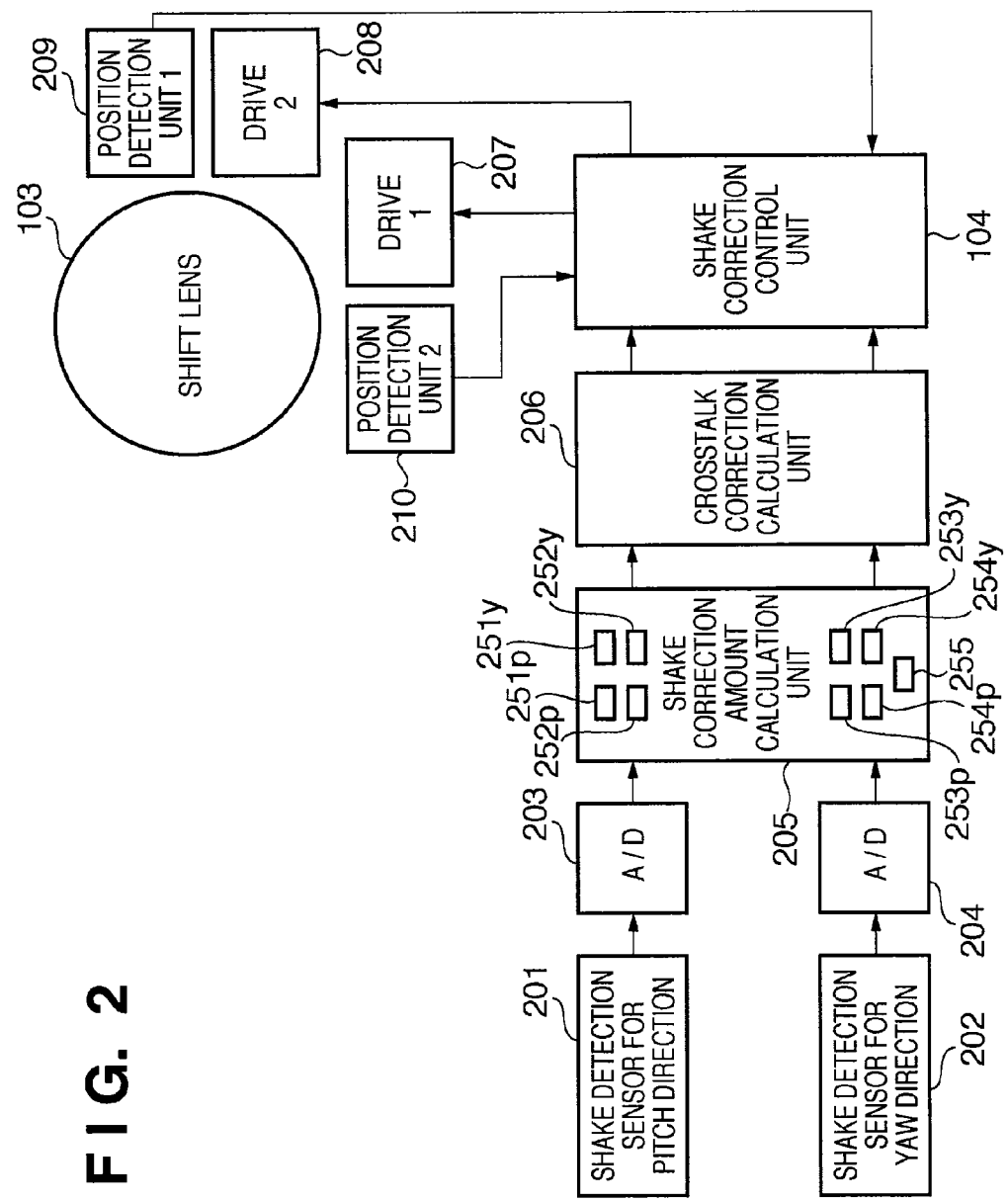
FIG. 2 is a block diagram showing the internal arrangement of a shake correction device according to the first embodiment of the present invention.

FIG. 2 is a block diagram showing the simplified internal arrangement of a shake correction processing unit in the image capture apparatus having the shake correctional function.

The shake correction processing unit includes shake detection sensors 201 and 202, A/D converters 203 and 204, a shake correction amount calculation unit 205, a crosstalk correction calculation unit 206, the shake correction control unit 104, lens driving units 207 and 208, lens position detection units 209 and 210, and the shift lens 103. The shake correction amount calculation unit 205 includes digital high-pass filters (HPF) 251$p$ and 251$y$, and amplifiers (Amp) 252$p$ and 252$y$ for absorbing sensitivity variations of the shake detection sensors. Also, the shake correction amount calculation unit 205 includes digital low-pass filters (LPF) 253$p$ and 253$y$ for integrally transforming an angular velocity signal into an angle signal, and sensitivity adjustment units 254$p$ and 254$y$ for applying a gain (sensitivity) to convert an angle signal into a shake correction amount. Further, the shake correction amount calculation unit 205 includes a driving shaft shake correction amount calculation unit 255 for converting a shake correction amount to one in the driving shaft direction when the direction of the shake signal detection axis does not match that of the actuator driving shaft.

The shake detection sensors 201 and 202 are, for example, angular velocity sensors. The shake detection sensors 201 and 202 detect vibration amounts (angular velocities in the case of the angular velocity sensors) applied to the image capture apparatus owing to a camera shake. The shake detection sensors 201 and 202 convert the detected vibration amounts into electrical signals, and send them to the A/D converters 203 and 204.

The A/D converters 203 and 204 convert angular velocity signals in the pitch and yaw directions, which have been detected by the shake detection sensors 201 and 202, from analog signals into digital signals. The A/D converters 203 and 204 input the converted digital shake signals to the shake correction amount calculation unit 205.

In the shake correction amount calculation unit 205, first, the HPFs 251p and 251y remove offsets of DC components from the shake signals. Then, the Amps 252p and 252y apply variation adjustment gains. The LPFs 253p and 253y integrally transform the angular velocity signals into angle signals. The sensitivity adjustment units 254p and 254y convert the angle signals into shake correction amounts. For example, proper shake correction can be done at the current focal length by changing the sensitivity in accordance with the focal length (decreasing the sensitivity at the wide-angle end and increasing it at the telephoto end).

When the direction of the shake signal detection axis does not match that of the actuator driving shaft, the driving shaft shake correction amount calculation unit 255 converts signals in the pitch and yaw directions into shake correction amounts in the driving shaft direction. When the direction of the shake signal detection axis matches that of the actuator driving shaft, the driving shaft shake correction amount calculation unit 255 does nothing.

The shake correction amount calculation unit 205 inputs, to the crosstalk correction calculation unit 206, two calculated shake correction amounts in the two axis directions perpendicular to each other. The crosstalk correction calculation unit 206 is a conversion means, and corrects (cancels) a driving error (crosstalk) generated by a rotation moment applied to the shift lens 103. Detailed processing by the crosstalk correction calculation unit 206 will be described later.

The crosstalk correction calculation unit 206 inputs, to the driving units 207 and 208, driving signals corresponding to the crosstalk-corrected shake correction amounts. The driving units 207 and 208 drive the shift lens 103. Note that the driving units 207 and 208 are two driving means capable of driving the shift lens 103 in the pitch axis direction and yaw axis direction.

The position detection units 209 and 210 (for example, Hall devices or photointerrupters) detect the position of the shift lens 103, and feed back the signals to the shake correction control unit 104, thereby controlling the lens position and executing shake correction.

FIG. 3 is a view showing a rotation moment generation principle. Reference numeral 301 denotes a shift lens. Reference numerals 302 and 304 denote an actuator and position detection element in the A axis direction, respectively. Reference numerals 303 and 305 denote an actuator and position detection element in the B axis direction, respectively. Reference numeral 306 denotes a center of gravity of the shift lens unit. Reference numeral 307 denotes a center of action of driving forces by the actuators for both the A and B axes. As shown in FIG. 3, the A axis actuator 302 generates a force Fa in the A axis direction, and the B axis actuator 303 generates a force Fb in the B axis direction, generating a force F in the upward direction on the sheet surface. When the center 306 of gravity of the shift lens unit and the center 307 of action of the forces along both the A and B axes have an offset (shift) by a distance u, a rotation moment N is generated around the center 306 of gravity in the shift lens unit:

$$N = u \times F \quad (1)$$

FIG. 4 is a graph showing the influence of a crosstalk generated by the rotation moment and a lens position after crosstalk correction. The ordinate indicates the A axis direction of the lens position (for example, the yawing direction axis of the image capture apparatus), and the abscissa indicates the B axis direction of the lens position (for example, the pitch direction axis of the image capture apparatus).

The upper graph in FIG. 4 shows an actual lens position upon driving the shift lens by a shake correction amount used when no crosstalk correction calculation is done. As the lens moves apart from the center, the crosstalk increases almost linearly. A crosstalk is generated in the negative direction along the A axis upon driving in the positive direction along the B axis. Also, a crosstalk is generated in the negative direction along the B axis upon driving in the positive direction along the A axis.

The lower graph in FIG. 4 shows an actual lens position when the shake correction amount is corrected to set the actual lens position on the A and B axes. A shake correction amount corrected by the crosstalk can be approximated to transformation of a shake correction amount before correction (before conversion) from an orthogonal coordinate system (A and B axes) into an oblique coordinate system (A' and B' axes). Let $a=(\alpha,\beta)$ be a base obtained from the oblique angle of the B' axis with respect to the B axis, and $b=(\gamma,\delta)$ be a base obtained from the oblique angle of the A' axis with respect to the A axis. Then, a shake correction amount after crosstalk correction can be calculated by the following affine transformation. That is, a virtual lens position command value is set to move an actual lens position to a desired position (target position), and the transformation matrix is calculated from the difference, like equation (2):

$$\begin{pmatrix} X' \\ Y' \end{pmatrix} = \begin{pmatrix} \alpha & \gamma \\ \beta & \delta \end{pmatrix} \cdot \begin{pmatrix} X \\ Y \end{pmatrix} \quad (2)$$

where (X',Y') is a shake correction amount after crosstalk correction, and (X,Y) is a shake correction amount before crosstalk correction.

The crosstalk correction calculation unit 206 applies the above transformation to the shake correction amount.

(Second Embodiment)

Figure 5:
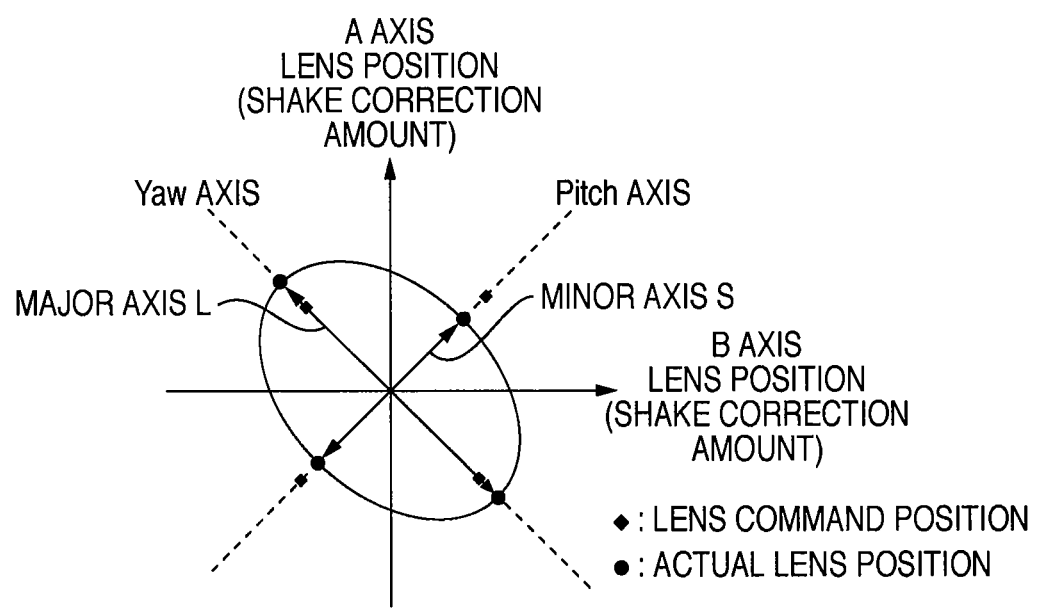
FIG. 5 is a graph briefly showing crosstalk correction in the second embodiment.

FIG. 5 shows an actual lens position as a result of setting shake correction amounts before crosstalk correction at four points (d,d), (−d,d), (−d,−d), and (d,−d) when a driving force acts at one point other than the center of gravity of the shift lens.

The actual lens position moves toward the center from shake correction amounts at the points in the first and third quadrants, and apart at the points in the second and fourth quadrants. Considering even the upper graph of FIG. 4, shake correction values expressed in an orthogonal coordinate system can be approximated to affine transformation of an actual lens position into an oblique coordinate system owing to a crosstalk. By executing inverse transformation of the affine transformation for the shake correction values, the actual lens position is corrected to almost the desired position.

More specifically, let s be the ratio of the distance S (moving amount) of the actual lens position upon driving to the stroke between the shake correction amounts (d,d) and (−d,−d), and l be the ratio of the distance (L) of the actual lens position upon driving to the stroke between the shake correction amounts (−d,d) and (d,−d). Then, a shake correction amount after crosstalk correction increases in the pitch axis direction and decreases in the yaw axis direction because the coordinate system is made oblique in a direction opposite to the driving direction of the actual lens position.

Figure 6:
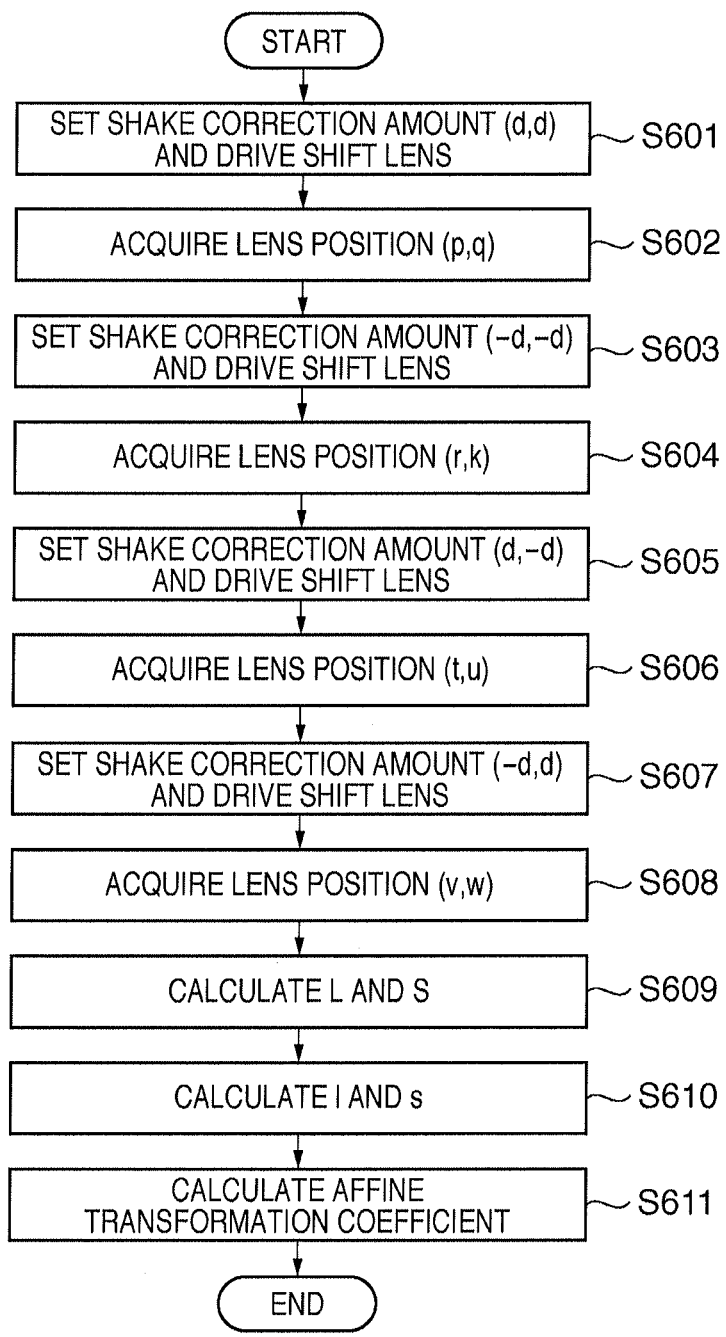
FIG. 6 is a flowchart showing crosstalk correction in the second embodiment.

This will be explained in more detail with reference to the flowchart of FIG. 6. In step S601, a B axis shake correction amount d and A axis shake correction amount d are set to drive the shift lens. In step S602, a lens position (p,q) moved by driving in step S601 is acquired. In step S603, a B axis shake correction amount −d and A axis shake correction amount −d are set to drive the shift lens. In step S604, a lens position (r,k) moved by driving in step S603 is acquired. In step S605, a B axis shake correction amount d and A axis shake correction amount −d are set to drive the shift lens. In step S606, a lens position (t,u) moved by driving in step S605 is acquired. In step S607, a B axis shake correction amount −d and A axis shake correction amount d are set to drive the lens. In step S608, a lens position (v,w) moved by driving in step S607 is acquired. In step S609, S and L are calculated by equations (3):

$$S=\sqrt{\{(p-r)^2+(q-k)^2\}}$$

$$L=\sqrt{\{(t-v)^2+(u-w)^2\}} \quad (3)$$

In step S610, the ratios 1 and s of driving amounts to correction amounts are calculated by equations (4):

$$s=S/(2\sqrt{2}.d)$$

$$l=L/(2\sqrt{2}.d) \quad (4)$$

In step S611, the transformation coefficient of affine transformation is calculated by equation (5):

$$\begin{pmatrix} X' \\ Y' \end{pmatrix} = \begin{pmatrix} \frac{1+s}{2} & \frac{1-s}{2} \\ \frac{1-s}{2} & \frac{1+s}{2} \end{pmatrix} \cdot \begin{pmatrix} X \\ Y \end{pmatrix} \quad (5)$$

where (X',Y') is a shake correction amount after crosstalk correction, and (X,Y) is a shake correction amount before crosstalk correction. A crosstalk correction calculation unit 206 executes the above transformation to perform crosstalk processing for the shake correction amount. The method in the second embodiment can correct a crosstalk more easily than that in the first embodiment.

(Third Embodiment)

Figure 7:
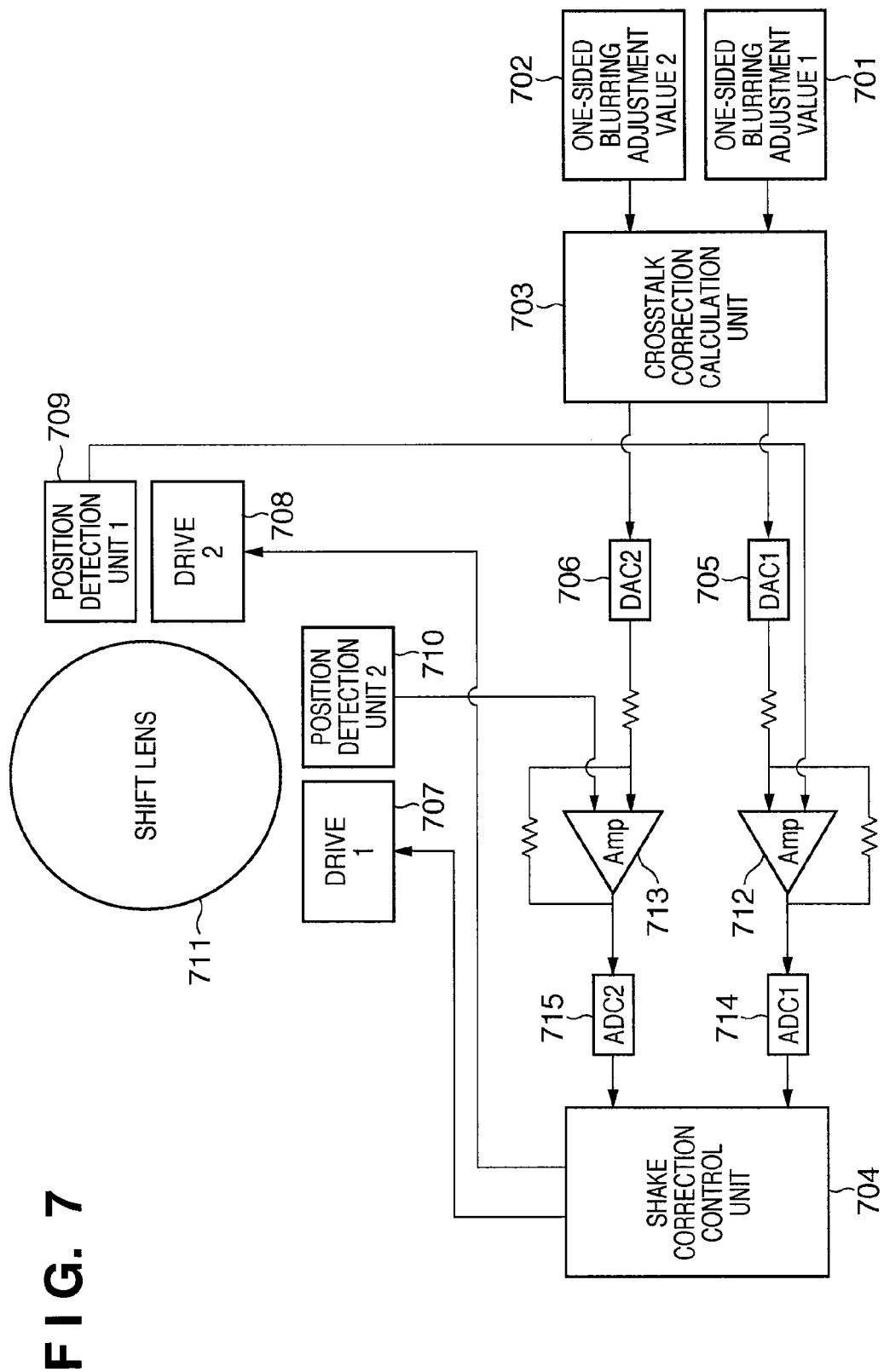
FIG. 7 is a block diagram briefly showing crosstalk correction in the third embodiment.

FIG. 7 is a block diagram showing the simplified internal arrangement of a shake correction control unit (blurring correction control unit) including a one-sided blurring correction unit. Reference numeral 701 denotes one-sided blurring adjustment value 1 for adjusting the driving center position of position detection unit 1 along the direction axis; and 702, one-sided blurring adjustment value 2 for adjusting the driving center position of position detection unit 2 along the direction axis. A crosstalk correction calculation unit 703 corrects a crosstalk generated by a rotation moment generated depending on the driving center position. A DAC 1 705 and DAC 2 706 set correction values after crosstalk correction. A shake correction control unit 704 calculates a drive output based on the shake correction amounts and a fed-back lens position deviation. The calculated drive output is set in drive units 707 and 708. Position detection units 709 and 710 detect the position of a shift lens 711. Note that the shake correction control unit 704 in FIG. 7 includes blocks denoted by reference numerals 201 to 206 in FIG. 2 in the first embodiment.

To correct optical one-sided burring, the driving center position of the shift lens is changed by appropriately adjusting the one-sided blurring adjustment value 1 701 and one-sided blurring adjustment value 2 702. These one-sided blurring adjustment values are adjusted in every image capture apparatus before shipment from the factory, and a one-sided blurring amount is corrected in accordance with the individual difference of the optical system. The one-sided blurring adjustment value takes a value corresponding to the focal length, and the set adjustment value is changed every time the focal length changes.

In the absence of a crosstalk by the rotation moment, it suffices to directly set the one-sided blurring adjustment values in the DAC 1 705 and DAC 2 706. In the presence of the rotation moment, an error increases as the shift lens moves apart from the center, similar to the first and second embodiments. To correct the error, the same crosstalk correction calculation as those in the first and second embodiments is done for the one-sided blurring adjustment value 1 701 and one-sided blurring adjustment value 2 702. The contents of the crosstalk correction calculation are the same as those of equations (2) and (5) described in the first and second embodiments:

$$\begin{pmatrix} A' \\ B' \end{pmatrix} = \begin{pmatrix} \alpha & \gamma \\ \beta & \delta \end{pmatrix} \cdot \begin{pmatrix} A \\ B \end{pmatrix} \quad (6)$$

$$\begin{pmatrix} A' \\ B' \end{pmatrix} = \begin{pmatrix} \frac{1+s}{2} & \frac{1-s}{2} \\ \frac{1-s}{2} & \frac{1+s}{2} \end{pmatrix} \cdot \begin{pmatrix} A \\ B \end{pmatrix} \quad (7)$$

where A is a one-sided blurring adjustment value for adjusting the driving center position of the position detection unit 1 709 along the direction axis, and B is a one-sided blurring adjustment value for adjusting the driving center position of the position detection unit 2 710 along the direction axis. $\alpha$, $\beta$, $\gamma$, and $\delta$ are the same as those in equation (2), and l and s are the same as those in equation (5). A' is a one-sided blurring adjustment value after crosstalk correction and serves as a set value for DAC 1. B' is a one-sided blurring adjustment value after crosstalk correction and serves as a set value for DAC 2.

In the above embodiments, the image capture apparatus has been exemplified as a digital camera, but may be a digital video camera, or a shake correction device or optical device used for a single-lens reflex interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-162214, filed Jul. 16 2010, and 2011-104746, filed May 9, 2011 which are hereby incorporated by reference herein in their entirety.

What is claimed is:

1. An image blurring correction device including a correction member movable in a direction perpendicular to an optical axis of an imaging optical system and two driving units which drive the correction member in different directions, a rotation moment being generated in the correction member driven by the driving units, comprising:

a shake detection unit which detects a shake of the image blurring correction device;

a correction amount calculation unit which calculates a correction amount based on an output from said shake detection unit;

an error calculation unit which calculates a driving error generated by a rotation moment based on the rotation moment applied to the correction member; and a first conversion unit which converts the correction amount to cancel the driving error, wherein the first conversion unit converts the correction amount based on an actual position of the correction member when the correction member is driven without considering the rotation moment, such that the actual position of the correction member matches a target position of the correction member,
wherein the driving units drive the correction member based on the correction amount converted by said first conversion unit.

2. The device according to claim 1, wherein
said first conversion unit converts the correction amount by affine transformation, and
each coefficient of a transformation matrix used in the affine transformation is adjusted to drive an actual position of the correction member to a target position of the correction member.

3. The device according to claim 1, wherein
said first conversion unit converts the correction amount by affine transformation, and
each coefficient of a transformation matrix used in the affine transformation is determined by a ratio of a correction amount before conversion by said first conversion unit and an actual moving amount of the correction member upon driving the correction member.

4. The device according to claim 3, wherein the transformation matrix used in the affine transformation is $$\begin{pmatrix} X' \\ Y' \end{pmatrix} = \begin{pmatrix} \frac{1+s}{2} & \frac{1-s}{2} \\ \frac{1-s}{2} & \frac{1+s}{2} \end{pmatrix} \cdot \begin{pmatrix} X \\ Y \end{pmatrix}$$

where "s" and "l" are ratios of correction amounts before conversion by said first conversion unit and actual moving amounts of the correction member upon driving the correction member, and
when correction amounts before conversion by said first conversion unit are set at four points (d,d), (−d,d), (−d,−d), and (d,−d), and a lens position corresponding to the actual moving amount of the correction member upon driving the correction member is defined by four points (p,q), (r,k), (t,u), and (v,w) in correspondence with the correction amounts, $$s=\sqrt{\{(p-r)^2+(q-k)^2\}}/(2\sqrt{2}\cdot d)$$

$$l=\sqrt{\{(t-v)^2+(u-w)^2\}}/(2\sqrt{2}\cdot d).$$

5. An image capture apparatus comprising an image blurring correction device defined in claim 1.

6. The device according to claim 1, further comprising:
a second conversion unit which converts an adjustment value that is to change a driving center of the correction member, wherein the second conversion unit converts the adjustment value based on the correction value and an actual position of the correction member when the correction member is driven without considering the rotation moment, such that the actual position of the correction member matches a target position of the correction member, and
wherein the driving units set the driving center of the correction member based on the adjustment value converted by the second conversion unit based on the adjustment value converted by the second conversion unit.

7. The device according to claim 6, wherein
said second conversion unit converts the adjustment value by affine transformation, and
each coefficient of a transformation matrix used in the affine transformation is adjusted to drive the actual position of the correction member to the target position of the correction member.

8. The device according to claim 6, wherein
said second conversion unit converts the adjustment value by affine transformation, and
each coefficient of a transformation matrix used in the affine transformation is determined by a ratio of a correction amount before conversion by said first conversion unit and the actual moving amount of the correction member upon driving the correction member.

9. An image blurring correction device including a correction member movable in a direction perpendicular to an optical axis of an imaging optical system and two driving units which drive the correction member in different directions, centers of action of driving forces of the driving units deviating from a center of gravity of the correction member, comprising:
a shake detection unit which detects a shake of the image blurring correction device;
a correction amount calculation unit which calculates a correction amount based on an output from said shake detection unit;
an error calculation unit which calculates a driving error based on the centers of action of driving forces of the driving units and the center of gravity of the correction member; and
a first conversion unit which converts the correction amount to cancel the driving error, wherein the first conversion unit converts the correction amount based on an actual position of the correction member when the correction member is driven without considering the rotation moment, such that the actual position of the correction member matches a target position of the correction member,
wherein the driving units drive the correction member based on the correction amount converted by said first conversion unit.

10. The device according to claim 9, wherein
said first conversion unit converts the correction amount by affine transformation, and
each coefficient of a transformation matrix used in the affine transformation is adjusted to drive an actual position of the correction member to a target position of the correction member.

11. The device according to claim 10, wherein the transformation matrix used in the affine transformation is $$\begin{pmatrix} X' \\ Y' \end{pmatrix} = \begin{pmatrix} \frac{1+s}{2} & \frac{1-s}{2} \\ \frac{1-s}{2} & \frac{1+s}{2} \end{pmatrix} \cdot \begin{pmatrix} X \\ Y \end{pmatrix}$$

where "s" and "l" are ratios of correction amounts before conversion by said first conversion unit and actual moving amounts of the correction member upon driving the correction member, and
when correction amounts before conversion by said first conversion unit are set at four points (d,d), (−d,d), (−d,−d), and (d,−d), and a lens position corresponding to the actual moving amount of the correction member upon driving the correction member is defined by four points (p,q), (r,k), (t,u), and (v,w) in correspondence with the correction amounts, $s=\sqrt{\{(p-r)^2+(q-s)^2\}}/(2\sqrt{2}\cdot d)$ $l=\sqrt{\{(t-v)^2+(u-w)^2\}}/(2\sqrt{2}\cdot d)$.

12. The device according to claim 9, wherein
said first conversion unit converts the correction amount by affine transformation, and
each coefficient of a transformation matrix used in the affine transformation is determined by a ratio of a correction amount before conversion by said first conversion unit and an actual moving amount of the correction member upon driving the correction member.

13. An image capture apparatus comprising an image blurring correction device defined in claim 9.

14. The device according to claim 9, further comprising:
a one-sided blurring correction unit which corrects a adjustment value of an optical image by adjusting a driving center of the imaging optical system; and
a second conversion unit which converts the adjustment value to cancel the driving error generated by a rotation moment applied to the correction member,
wherein the driving units set a driving center of the correction member based on the adjustment value converted by said second conversion unit, and correct blurring of the optical image.

15. The device according to claim 14, wherein
said second conversion unit converts the one-sided blurring amount by affine transformation, and
each coefficient of a transformation matrix used in the affine transformation is adjusted to drive an actual position of the correction member to a target position of the correction member.

16. The device according to claim 14, wherein
said second conversion unit converts the adjustment value by affine transformation, and
each coefficient of a transformation matrix used in the affine transformation is determined by a ratio of a correction amount before conversion by said first conversion unit and an actual moving amount of the correction member upon driving the correction member.

17. A method of controlling an image blurring correction device including a correction member movable in a direction perpendicular to an optical axis of an imaging optical system and two driving units which drive the correction member in different directions, a rotation moment being generated in the correction member driven by the driving units, comprising:
detecting a shake of the image blurring correction device;
calculating a correction amount based on an output from the detecting a shake;
calculating a driving error generated by a rotation moment based on the rotation moment applied to the correction member; and
converting the correction amount to cancel the driving error, wherein the first conversion step converts the correction amount based on an actual position of the correction member when the correction member is driven without considering the rotation moment, such that the actual position of the correction member matches a target position of the correction member,
wherein the driving units drive the correction member based on the correction amount converted in the converting the correction amount.

18. A method of controlling an image blurring correction device including a correction member movable in a direction perpendicular to an optical axis of an imaging optical system and two driving units which drive the correction member in different directions, centers of action of driving forces of the driving units deviating from a center of gravity of the correction member, comprising:
detecting a shake of the image blurring correction device;
calculating a correction amount based on an output from the detecting a shake;
calculating a driving error based on the centers of action of driving forces of the driving units and the center of gravity of the correction member; and
converting the correction amount to cancel the driving error, wherein the first conversion step converts the correction amount based on an actual position of the correction member when the correction member is driven without considering the rotation moment, such that the actual position of the correction member matches a target position of the correction member,
wherein the driving units drive the correction member based on the correction amount converted in the converting the correction amount.

* * * * *